Jan. 3, 1967 T. A. McGREGOR 3,295,242
ADVERTISING DEVICE FOR TAXIS AND THE LIKE
Filed March 17, 1966
2 Sheets-Sheet 1

THOMAS A. McGREGOR, INVENTOR

BY George R Nimmer

ATTORNEY

Jan. 3, 1967 T. A. McGREGOR 3,295,242
ADVERTISING DEVICE FOR TAXIS AND THE LIKE
Filed March 17, 1966 2 Sheets-Sheet 2

THOMAS A. McGREGOR, INVENTOR

BY George R Nimmer
ATTORNEY

United States Patent Office 3,295,242
Patented Jan. 3, 1967

3,295,242
ADVERTISING DEVICE FOR TAXIS AND
THE LIKE
Thomas A. McGregor, Omaha, Nebr., assignor to Star
Station, Inc., Omaha, Nebr., a corporation of Nebraska
Filed Mar. 17, 1966, Ser. No. 535,221
1 Claim. (Cl. 40—129)

This invention relates to an upright advertising device for use with a taxi and the like, and particularly relates to that type of device which is adapted to uprightly support two back-to-back elongate advertising sign boards transversely across the roof of a taxicab.

Taxicab companies commonly derive substantial sources of revenue through the sale of graphic advertising matter to be placed upon the roofs of their taxicab vehicles. Public reaction surveys conducted by advertising agencies have long revealed that advertising devices which are transversely disposed across the roof of a taxicab to present a rearwardly exposed advertising message are especially effective, primarily because the occupants of trailing vehicles are exposed to the message over a sustained length of time. Consequently, the rearwardly facing transversely disposed message of a forwardly moving vehicle commands a much higher advertising rate than do alternate roof positions which inherently present to potential observers a comparatively brief exposure to the message, said less desirable roof positions including a forwardly facing transversely disposed message and the sidewardly facing messages of longitudinally disposed advertising devices.

Although the public relations industry well appreciates the superior effectiveness of transversely disposed roof advertising, especially of the rearwardly facing messages, the prior art has been extremely reluctant to provide transversely disposed advertising because of the air resistance encountered by a forwardly moving taxicab. The air resistance force encountered tends to topple a transversely disposed upright advertising device, and for this reason prior art transverse signs have had to employ heavy or elaborate structural members and roof attachment means. Because of the expense and complexity associated with transverse roof signs, the prior art has concentrated its activities upon longitudinally disposed roof devices which, due to their longitudinal position, are much less affected by the air resistance factor. Thus, the prior art has, by virtue of the complexity and expense associated with transversely disposed advertising signs, deemed the transverse variety as being economically impractical in spite of the premium advertising rates they are able to command.

Longitudinally disposed advertising devices of recent vintage have employed a pair of sidewardly facing sign boards having phosphorescent graphic matter, each sign board being illuminated with a fluorescent tube, both fluorescent tubes being powered by the taxi's electrical system. While the combination of phosphorescent graphic matter and fluorescent tube illumination means does result in a very striking visual effect, the use of two fluorescent tubes does provide a serious drain upon the taxi's electrical system thus commonly resulting in failure of one or more of the fluorescent tubes or of the taxi's electrical system or of both.

It is accordingly a general object of the present invention to provide an advertising device adapted to uprightly support two back-to-back sign boards, one facing in the forward direction and the other facing in the rearward direction of a forwardly moving vehicle, said device being transversely disposed across the roof of a taxicab or similar surface vehicle.

It is a specific object to provide an advertising device wherein a pair of uprightly vertical sign boards are utilized that extend transversely to the taxi's direction of travel and which can be viewed from the rear and front of the taxi. The use of uprightly vertical sign boards is very important because slanting or oblique sign boards developed by the prior art to upwardly deflect the air resistance are comparatively unattractive and have but a nominal advertising value.

It is another object of the present invention to provide a transversely disposed advertising device which is simple in construction and which can be manufactured at low cost. However, notwithstanding the simplicity of construction, the advertising device of the present invention is capable of bearing up under rugged use and will remain stably vertically upright even under the influence of frontal air resistance.

It is another object to provide an advertising device for vehicle roofs, which may be readily transversely attached to vehicles having different roof contours.

It is another object to provide an advertising device in which it is simple and easy to change the advertising sign board carried by the advertising device.

It is yet another object of the present invention to provide an advertising device for use with a taxi, that is easily and quickly removable from and replaceable on the taxi roof, so that the advertising device can be temporarily removed to permit washing or painting of the taxi roof.

It is still another object to provide an advertising device that is suitable for daytime use and which may be suitably illuminated with a fluorescent tube for night time use.

It is another object to provide the advertising device with an optimum degree of illumination with a fluorescent tube without overtaxing the electrical system of the taxicab.

Yet another object is to improve the design and construction of roof type advertising devices.

A further object is to provide, in such an advertising device for combination night and day use, a self-contained cover and lighting assembly that has the fluorescent tube, sockets, electrical components, and circuit means, all conveniently and simply mounted within the device.

With the above and other objects and advantages in view, which will become apparent as the description proceeds, the invention comprises the novel form, combination, and arrangement of parts as hereinafter more fully described, reference being had to the accompanying drawings wherein like numbers refer to like parts in the several views and in which.

Figure 1:
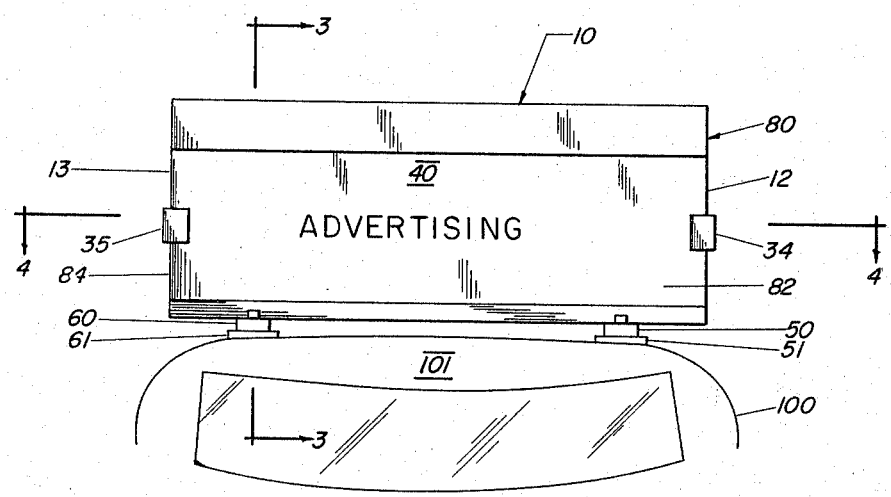
FIGURE 1 is a rearward elevational view of the advertising device of the present invention shown attached to and positioned transversely of the roof of an automobile, nearer to the rearward extremity of the automobile.
Figure 4:
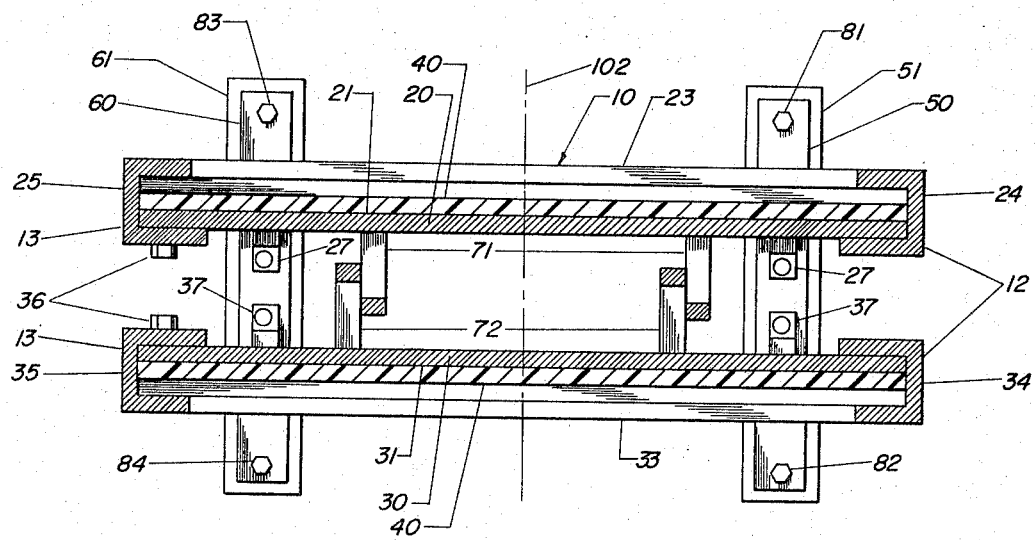
FIGURE 4 is a sectional view taken along line 4—4 of FIGURE 1.

The advertising device 10 of the present invention having endward extremities 12 and 13 comprises a pair of uprightly rigidly spaced upward opposed panels 20 and 30; holding means to uprightly position an advertising sign board, e.g. 40, at the exterior surfaces 21 and 31 of the upright panels; illumination means, e.g. 90, positioned adjacent to the upper portion of rearward panel exterior surface 31; a pair of opposed elongate anchoring straps 50 and 60 attached to the lower extremities of advertising device 10; and at least four attachment means, e.g. 81–84, positioned remotely of exterior surfaces 21 and 31, said attachment means joining straps 50 and 60 and the roof 101 of automobile 100.

Figure 3:
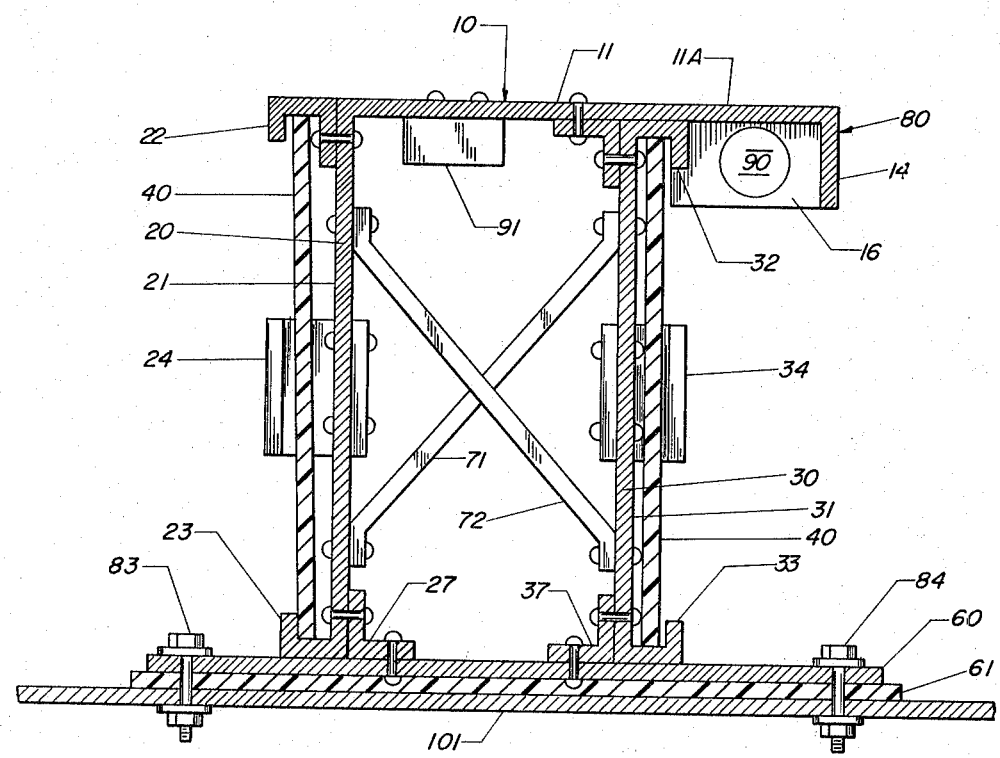
FIGURE 3 is an enlarged sectional elevational view taken along line 3—3 of FIGURE 1 to show assembly details of the device.
Figure 2:
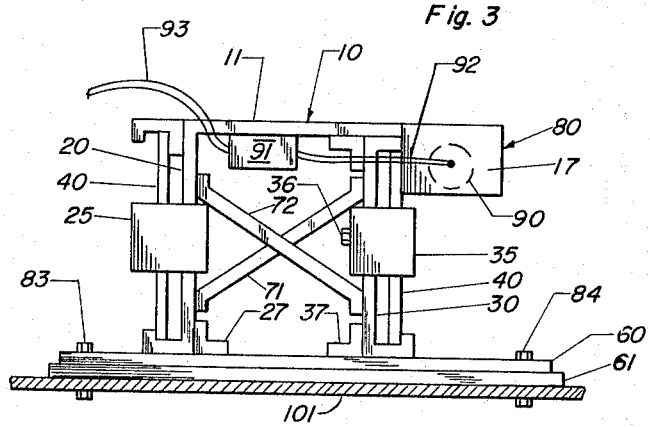
FIGURE 2 is a general sideward elevational view of the advertising device, specifically of the left side of FIGURE 1, the right side view of FIGURE 1 being substantially a mirror image of FIGURE 2.

Opposed upright rectangular panels 20 and 30 are transversely positioned with respect to longitudinal central axis 102 of automobile roof 101. Panels 20 and 30 are of substantially equal lengths and are rigidly spaced apart in substantially parallel relationship with suitable bracing means, as for example, two sets of crisscrossed diagonal braces 71 and 72. Braces 71 and 72 are attached to the interior surfaces of panels 20 and 30, near the upper and lower extremities of said panels, as by welding or as by means of rivet fastener means as shown in FIGURE 3.

There are holding means to removably position a sign board 40 at the respective exterior surfaces 21 and 31 of upright panels 20 and 30. The sign board holding means for each upright panel comprises L-shaped horizontal flanges attached along the upper and lower portions of panels 20 and 30 to retain sign boards 40 in substantial upright parallelism with panels 20 and 30. Specifically, along the upper and lower edges of panel 20 are upper flange 22 and lower flange 23, terminal portions of said flanges 22 and 23 providing lips externally offset in relationship to surfaces 21, while similarly along the upper and lower edges of panel 30 are upper flange 32 and lower flange 33, terminal portions of said flanges 32 and 33 providing lips externally offset in relationship to exterior surface 31. At the rightward end 12 of device 10 (with reference to FIGURE 1), the sign board holding means comprises vertically disposed channelled clips to limit rightward movement of sign boards 40. Specifically, a channelled clip 24 is permanently attached as by means of rivets to the rightward edge of panel 20 while an identical channelled clip 34 is similarly attached to the rightward edge of panel 30. Vertical clips 24 and 34 include intermediate portions perpendicular to exterior surfaces 21 and 31 and terminal portions providing lips that are externally offset with the said exterior surfaces 21 and 31. Finally, the holding means comprises another set of channelled clips 25 and 35 at the leftward side 13 of device 10 to limit leftward movement of sign boards 40, said clips 25 and 35 being identical to clips 24 and 34 at the rightward side except that clips 25 and 35 are removably attached as by means of threaded bolts, e.g. 36, to permit slidable removal of a sign board 40. While the clips 24, 25, 34, and 35 may be shorter than the vertical height of panels 20 and 30, as shown in the drawing, said clips may be of any convenient length including substantially the full vertical height of said panels' vertical height. Preferably, the lipped portions for the various components of each sign board holding means are offset from the panel exterior surface an identical distance.

There is a rigid roof panel 11 positioned between and attached to upright panels 20 and 30, said roof panel being coextensive with the distance between ends 12 and 13. Thus, roof panel 11 does complement the structural reinforcement of crisscrossed diagonal braces 71 and 72. Portion 11A of roof panel 11 extends rearwardly of rearward panel rearward surface 31 and a terminal portion 14 extends downwardly, said overhang portion 11A and terminal portion 14 providing a shield or protector 80 for illumination means 90. Protector 80 includes end plates 16 and 17, said end plates being integral portions of roof 11, structurally connected to terminal portion 14, and bent perpendicularly to terminal portion 14.

Illumination means 90 is herein shown as a fluorescent tube, which is preferably of the so-called "black light" type, or it may be of the so-called "white light" type without departing from the spirit of the present invention. If the exterior surface of the adjacent sign board 40 is provided with phosphorescent graphic matter, then the so-called "black light" type fluorescent tube brilliantly illuminates the graphic matter to provide an especially vivid advertising message. Tube 90 is removably mounted within shield 80 by suitable conventional electrical socket means (not shown) at the interior surfaces of end plates 16 and 17. Of course, for day time use, illumination means are not required. A single illumination means 90 is employed at the rearward side 31 of device 10 since the rearward side commands a premium advertising rate. It is not normally desirable or necessary to illuminate forward side 31 since the forward side commands a relatively low advertising rate and because the use of a second fluorescent tube for the forwardly facing panel 20 would severely tax the vehicle's electrical system.

Mounted with rivet means at the underside of roof panel 11 between panels 20 and 30 is an electrical unit 91, said unit comprising a combination of transistors and ballasts which convert the electricity from the taxicab system to the form usable for a fluorescent tube 90. There is an electrical lead 92 piercing end plate 17 so as to connect fluorescent tube 90 with electrical unit 91, and another electrical lead 93 proceeding from unit 91 toward the taxicab primary electrical system.

Along the lower horizontal edge of panel 20 is a pair of L-shaped brackets 27, brackets 27 being conveniently riveted to the interior surface of panel 20. The lower horizontal surface of each bracket 27 is substantially coplanar with the lower horizontal surface of flange 23. Similarly, along the lower horizontal edge of panel 30 is a pair of L-shaped brackets 37, brackets 37 being conveniently riveted to the interior surface of panel 30. The lower horizontal surface of each bracket 37 is substantially coplanar with the lower horizontal surface of flange 33.

A pair of substantially parallel opposed anchoring straps 50 and 60 are attached to lower portions of the advertising device 10, substantially perpendicular to panels 20 and 30. Specifically, the upper surfaces of each anchoring strap 50 and 60 abut the lower horizontal surfaces of lower flange 23, bracket 27, bracket 37, and lower flange 33, and each anchoring strap is attached to panels 20 and 30 as, for example, to brackets 27 and 37 with rivets passing through the horizontal portions thereof. The respective elongate lengths of anchoring straps 50 and 60 are substantially equal and the forward extremity of each strap extends forwardly of the forward panel holding means while the rearward extremity of each anchoring strap extends rearwardly of the protector 80. Thus, the forward and rearward extremities of anchoring straps 50 and 60 also provide the forward and rearward extremities of advertising device 10.

Advertising device 10 is attached transversely across the longitudinal central axis 102 of taxi roof 101 by means of at least four suitable anchoring means joining an anchoring strap to the taxi roof 101. One of the at least four anchoring means joins anchoring strap 50 to roof 101 at a location positioned forwardly of the forward panel holding means, another of the said anchoring means joins anchoring strap 60 to roof 101 at a location positioned forwardly of the forward panel holding means, another of said anchoring means joins anchoring strap 50 to roof 101 at a location positioned rearwardly of light source 90, and another of said anchoring means joins anchoring strap 60 to roof 101 at a location positioned rearwardly of light source 90. Preferably, the at least four anchoring means may be as four threaded bolts 81–84, each passing through an anchoring strap and the taxi roof 101. Specifically, anchoring bolt 81 pierces strap 50 and roof 101 at a location positioned forwardly of the forward panel holding means 23, anchoring bolt 83 pierces anchoring strap 60 and roof 101 at a location positioned forwardly of forward panel holding means 23, anchoring bolt 82 pierces anchoring strap 50 and roof 101 at a location positioned rearwardly of light source 90, and anchoring bolt 84 pierces anchoring strap 60 and roof 101 at a location positioned rearwardly of light source 90. The respective locations of the respective anchoring means, e.g. 81–84, along anchoring straps 50 and 60, remotely positioned as already specified with respect to the forward panel holding means and to the light source, do result in sufficient stability to uprightly support the transversely disposed panels 20 and 30 against the air drag encountered by a forwardly moving taxicab 100. Resiliently deformable elongate gaskets 51 and 61 are disposed under anchoring straps 50 and 60, respectively, so that device 10 will readily conform to the contour of taxi roof 101. Bolt type anchoring means 81–84 do, of course, pierce gaskets 51 and 61 as well as anchoring straps 50 and 60 and roof 101.

With regard to the various structural members comprising advertising device 10, sheet metals are desirable for their ease of fabrication. Aluminum sheet metal is preferred because of that metal's light weight, innocuous corrosion properties, low cost, and especial ease of bending into the required configurations. For example, as is shown in FIGURE 3, a properly formed unitary sheet of metal can be fabricated to provide lower flange 23, forward panel 20, roof member 11, and protector 80 including end plates 16 and 17, while another properly formed unitary sheet of metal can be fabricated to provide lower flange 33, rearward panel 30, and upper flange 32. Because of its resistance to welding processes, the various aluminum structural members are conveniently riveted together, the several rivet connections being shown in FIGURE 3. Obviously, in the case of ferrous or other weldable metals, the various sheet metal members could alternatively be welded together. Anchoring straps 50 and 60 are attached to separate brackets 27 and 37 rather than to the lower integral flanges 23 and 33 of composite unitary sheet structures 23–20–11 and 33–30–32 because direct attachment of straps 50 and 60 to flanges 23 and 33 would almost certainly cause fatigue fracture of these composite unitary sheet structures at the 23–20 and 33–30 corner junctures.

From the foregoing, the construction and operation of the advertising device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

An advertising device adaptable for use with a taxi having an elongate roof extending fore and aft of said taxi, said advertising device being adapted for upright attachment to the taxi roof transversely of the longitudinal axis of said taxi elongate roof, said advertising device comprising a pair of vertically upright panels including a forward panel and a rearward panel, said upright panels being rigidly spaced apart in substantially parallel relationship, said advertising device having a pair of exterior surfaces including a forward surface of the forward panel and a rearward surface of the rearward panel; said upright panels having upper and lower flanged holding means to position a sign board therebetween at the exterior surface of the respective upright panels, said rearward panel and the flanged holding means thereof being provided of a single length of sheet metal; a roof member connected between the forward and rearward upright panels, said roof member extending rearwardly of the rearward panel to provide a shield-like protector for an illumination means, said forward panel and the roof member being provided of a single length of sheet metal; illumination means attachably positioned within the shield-like protector rearwardly of the rearward panel; L-shaped bracket means attached to the interior surface of each upright panel, each said L-shaped bracket means having a substantially horizontal lower surface; and a pair of opposed anchoring straps, each anchoring strap being attached to L-shaped bracket means on each said upright panels, each said anchoring strap abutting the lower horizontal surface of the L-shaped bracket means, the forward extremity of each anchoring strap extending forwardly of the forward upright panel and the rearward extremity of each anchoring strap extending rearwardly of the illumination means.

References Cited by the Examiner

UNITED STATES PATENTS

| | | | |
|---|---|---|---|
| 2,077,585 | 4/1937 | Rivers | 40—129 |
| 2,158,195 | 5/1939 | Mutti | 40—129 |
| 3,153,294 | 10/1964 | Hay et al. | 40—129 |
| 3,224,129 | 12/1965 | Green | 40—129 |

EUGENE R. CAPOZIO, *Primary Examiner.*

S. M. BENDER, *Assistant Examiner.*